US009067087B2

(12) United States Patent
Noyes

(10) Patent No.: US 9,067,087 B2
(45) Date of Patent: Jun. 30, 2015

(54) MEMBRANE-ENABLED REVERSE LUNG

(71) Applicant: Oceaneering International, Inc., Hanover, MD (US)

(72) Inventor: Gary Patrick Noyes, Houston, TX (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 169 days.

(21) Appl. No.: 14/015,665

(22) Filed: Aug. 30, 2013

(65) Prior Publication Data
US 2014/0065054 A1    Mar. 6, 2014

Related U.S. Application Data

(60) Provisional application No. 61/694,998, filed on Aug. 30, 2012.

(51) Int. Cl.
| A62B 21/00 | (2006.01) |
| C25B 1/04  | (2006.01) |
| C25B 15/02 | (2006.01) |
| C25B 15/08 | (2006.01) |
| C25B 9/08  | (2006.01) |
| A62B 13/00 | (2006.01) |

(52) U.S. Cl.
CPC . *A62B 21/00* (2013.01); *C25B 1/04* (2013.01); *A62B 13/00* (2013.01); *C25B 15/02* (2013.01); *C25B 15/08* (2013.01); *C25B 9/08* (2013.01); *Y02E 60/366* (2013.01)

(58) Field of Classification Search
CPC .......... C25B 1/04; C25B 15/02; C25B 15/08; C25B 9/08; C25B 9/10
USPC ........................................... 204/263; 205/628
See application file for complete search history.

(56) References Cited

U.S. PATENT DOCUMENTS 7,993,500 B2 *   8/2011   Gilliam et al. ................ 204/263

OTHER PUBLICATIONS

Noyes, G.P.; "A Mobile Liquid Venting Membrane Separator for Carbon Dioxide, Humidity, and Waste Heat Removal from Spacesuits & Crewed Spacecraft"; SAE Aerospace Transactions 102(1), 1186-1192 (1993).

(Continued)

Primary Examiner — Nicholas A Smith
(74) Attorney, Agent, or Firm — McKenna Long & Aldridge LLP

(57) ABSTRACT

An air revitalization apparatus and method simultaneously removes carbon dioxide, water vapor, and heat from air and produces oxygen gas, hydrogen gas, and concentrated carbon dioxide gas, does not require an explosion proof enclosure, and includes a fan configured to blow air into a first gas-liquid contactor, an electrochemical cell including first through fourth passages configured to emit hydrogen gas, permit a flow of a carbonate-hydroxide solution, permit a flow of carbonate-bicarbonate solution, and emit oxygen gas, respectively, the first and fourth passages separated by at least three gas-impermeable membranes, and a second gas-liquid contactor, where the first gas-liquid contactor, second passage, and a first pump are configured to circulate the carbonate-hydroxide solution therethrough, where the second gas-liquid contactor, third passage, and a second pump are configured to circulate the carbonate-bicarbonate solution therethrough, and where the output of the first passage is operationally coupled to the second gas-liquid contactor.

20 Claims, 4 Drawing Sheets

(56) References Cited

OTHER PUBLICATIONS

Kang, M.S., et al; "Development of Carbon Dioxide Separation Process Using Continuous Hollow-Fiber Membrane Contactor and Watersplitting Electrodialysis"; Separation Science & Technology 37(8), 1789-1806 (2002).

Eisaman, M.D., et al; "CO2 Separation Using Bipolar Membrane Electrodialysis"; Energy & Environmental Science 4, 1319-1328 (2011).

* cited by examiner

MEMBRANE-ENABLED REVERSE LUNG

CROSS-REFERENCE TO RELATED APPLICATIONS

This application claims the benefit of priority from U.S. Provisional Application No. 61/694,998, filed on Aug. 30, 2012, the content of which is incorporated by reference herein in its entirety.

TECHNICAL FIELD

The present invention relates to life support systems of the type found in space stations and submarines, but the present invention is not limited to operation in those locations. More particularly, the present invention relates to electrochemical cells used to purify air by reducing levels of $CO_2$ and water vapor in the air and providing a flow of $O_2$. The present invention is two-fault tolerant and is therefore inherently safe from explosions caused by the mixing of $H_2$ and $O_2$ gases that it generates. Accordingly, embodiments of the present invention are able to operate without being enclosed within explosion-proof enclosures.

BACKGROUND OF THE INVENTION

Two technically challenging problems in crewed spacecraft and submarine life support are carbon dioxide ($CO_2$) separation and concentration, and safe oxygen ($O_2$) generation by water electrolysis. To add to the complexity, the processes of $CO_2$ separation and concentration and safe $O_2$ generation must be microgravity compatible for spacecraft use.

Recovery of $O_2$ in $CO_2$ as water by reduction with hydrogen ($H_2$) requires concentrating $CO_2$ from its low partial pressure in air to one atmosphere, a concentration factor of more than a hundred. This is done thermophysically on the International Space Station (ISS) with complex, heavy, energy-intensive equipment.

Liquid water electrolysis on the ISS is accomplished using an electrolysis cell that includes a cation-exchange membrane, typically a copolymer of polytetrafluoroethylene (PTFE) and polyfluorosulfonic acid (PFSA), such as DuPont's Nafion®. The ISS uses a single Nafion® cation-exchange membrane electrolysis cell. The ISS electrolysis cell system requires a very pure feed of water, high-speed rotary inertial gas-liquid separators, and an explosion-proof enclosure. The explosion-proof enclosure is necessitated by safety concerns that are inherently present in single membrane electrolysis cell systems. In such systems, the $O_2$ and $H_2$ gases are separated by only the single membrane. A failure of the membrane would allow the $O_2$ and $H_2$ gasses to combine, leading to a possibility of explosion. Systems that can tolerate only a single failure before the possibility of explosion arises are referred to herein as one-fault-tolerant. Explosion-proof enclosures are required for safety when using one-fault-tolerant water electrolysis systems. The explosion-proof enclosures protect human life and protect the integrity of the hull of the vehicle (or other structure) within which the one-fault-tolerant system (e.g., the single Nafion® cation-exchange membrane electrolysis cell of the ISS) operates. In order to eliminate the need for explosion-proof containers for water electrolysis systems, it would be desirable to make use of a water electrolysis system that would require two or more components to fail (i.e., multi-fault-tolerant) before the possibility of explosion would occur.

Because of the explosion potential inherent in a one-fault-tolerant water electrolysis system, and the consequent need for explosion-proof enclosures, systems of the kind described above are limited in size and weight. That is, the equipment itself must be small enough to fit inside of the explosion-proof enclosure. In volumetrically limited environments, such as the ISS, a submarine, a bunker, or a tank, room that could have been used for life support system equipment is reduced by the room occupied by its explosion-proof enclosure. It is desirable, therefore, to eliminate the need for an explosion-proof container in order to allow for additional room for life support equipment (or other equipment).

Moreover, known systems, such as that in the ISS require multiple machines with multiple moving parts, to perform the task of air revitalization. It is desirable, therefore, to reduce the number of machines used, the complexity of the machines, and the number of moving parts used in the overall performance of air revitalization task. Reduction of the number of machines saves space, while reduction in the number of moving parts increases overall reliability of the system due at least to failure of a moving part.

Furthermore, weight is very often a concern in the environments in which a water electrolysis system could be used. An explosion-proof enclosure, robust enough to contain an explosion of the kind described, will, of necessity, be heavy. It would therefore be beneficial to have a water electrolysis system that does not require an explosion-proof enclosure, in order to reduce the weight associated with the life support equipment.

Still further, in environments that have limited access to the outside world, the quantity of spare components carried in anticipation of a component failure is an important factor to be evaluated in the selection of a life support system. Therefore, it is desirable to have a life support system that incorporates a plurality of the same devices. In this way, only one spare part is needed to replace any one of the plurality of same devices.

Additionally, energy storage and generation are often limited in environments that make use of life support systems. Accordingly, it is desirable to have a life support system that utilizes less energy, while providing the same or more life support functionality, than known systems.

BRIEF SUMMARY OF THE INVENTION

To overcome problems and safety issues in known systems, embodiments of the present invention integrate both $CO_2$ separation and concentration, and $O_2$ generation by water electrolysis, into a single integrated device and process that removes $CO_2$, water vapor, and heat from air, and generates ambient-pressure gas streams of $O_2$ and $H_2$—$CO_2$ mixture. Embodiments of the present invention utilize multi-fault-tolerant designs that do not require explosion-proof enclosures (although the use of an explosion-proof enclosure would not depart from the scope of the invention).

Embodiments of the present invention find use in the fields of crewed spacecraft and submarines, for purposes of air revitalization (or purification). However, the use of the apparatus and methods claimed herein are not limited to those fields. For example, embodiments of the present invention may find use in mining operations to supply miners trapped due to cave-in with revitalized or purified air. Embodiments of the present invention may also find use in other sealed or potentially sealed environments, such as nuclear, biological, chemical hardened bunkers or vehicles such as tanks.

In one embodiment, a method includes circulating a hydroxide solution through a first gas-liquid contactor, contacting, in the first gas-liquid contactor, the hydroxide solution with air flowing through the first gas-liquid contactor to remove heat and water vapor from the air and to convert the hydroxide solution into a first carbonate solution, circulating the first carbonate solution through an electrochemical cell to convert the first carbonate solution into the hydroxide solution, recirculating the hydroxide solution from the electrochemical cell back through the first gas-liquid contactor, generating hydrogen gas in the electrochemical cell from the first carbonate solution, circulating a bicarbonate solution through a second gas-liquid contactor, separate from the first gas-liquid contactor, contacting, in the second gas-liquid contactor, the bicarbonate solution with the hydrogen gas generated in the electrochemical cell to generate the stream of concentrated $CO_2$ and to convert the bicarbonate solution into a second carbonate solution, separate from the first carbonate solution, circulating the second carbonate solution through the electrochemical cell to convert the second carbonate solution into the bicarbonate solution, recirculating the bicarbonate solution from the electrochemical cell back through the second gas-liquid contactor, and generating the stream of $O_2$ gas in the electrochemical cell from the second carbonate solution.

In one embodiment a method includes blowing air through a first gas-liquid contactor configured to convert a first precursor solution into a first electrolyte solution, flowing the first electrolyte solution into a second channel of a four channel electrochemical cell, flowing a second electrolyte solution into a third channel of the four channel electrochemical cell, applying a voltage between a hydrogen producing cathode in a first channel of the four channel electrochemical cell and an oxygen producing anode in a fourth channel of the four channel electrochemical cell to cause water splitting, hydrogen gas production at the cathode for hydrogen gas flow from the first channel, oxygen gas production at the anode for oxygen gas flow from the fourth channel, and ion flow through a first anion-exchange membrane separating the first from the second channels, the first electrolyte solution, a second anion-exchange membrane separating the second from the third channels, the second electrolyte solution, and a cation-exchange membrane separating the third and fourth channels, flowing a second precursor solution produced in the third channel through a second gas-liquid contactor configured to absorb the hydrogen gas flow from the first channel into the second precursor solution to emit $H_2$ and $CO_2$ gas and to convert the second precursor solution into the second electrolyte.

In one embodiment, an apparatus includes a first gas-liquid contactor configured to absorb $CO_2$, water vapor, and heat from air into a hydroxide solution circulating through the first gas-liquid contactor, and convert the hydroxide solution into a first carbonate solution by reaction with the absorbed $CO_2$, an electrochemical cell configured to receive the first carbonate solution from the first gas-liquid contactor, convert the first carbonate solution back into the hydroxide solution, electrolyze the water vapor from the air into separate hydrogen ($H_2$) and oxygen ($O_2$) gas flows, and convert a second carbonate solution, different from the first carbonate solution, into a bicarbonate solution, a first pump configured to receive the hydroxide solution from the electrochemical cell and recirculate the hydroxide solution back through the first gas-liquid contactor, a second pump configured to receive the bicarbonate solution from the electrochemical cell, a second gas-liquid contactor configured to receive the bicarbonate solution pumped from the second pump, desorb $CO_2$ from the bicarbonate solution into the $H_2$ gas flow from the electrochemical cell to produce concentrated $CO_2$ gas, and convert the bicarbonate solution back into the second carbonate solution.

BRIEF DESCRIPTION OF THE SEVERAL VIEW OF THE DRAWINGS

DETAILED DESCRIPTION OF EMBODIMENTS OF THE INVENTION

Reference will now be made in detail to the preferred embodiments of the present invention, examples of which are illustrated in the accompanying drawings. Wherever possible, the same reference numbers will be used throughout the drawings and description to refer to the same or like parts.

The life support (otherwise referred to as air revitalization or air purification) apparatus and methods claimed herein may be thought of as providing a reverse of the functionality of a human lung. The human lung removes $O_2$ from air and puts $CO_2$, water vapor (humidity), and heat into air; the apparatus and methods claimed herein remove $CO_2$, water vapor, and heat from air, and put $O_2$ into air. Therefore, for ease of reference and without any intent of limiting the claimed invention, each of the various embodiments of the apparatus described herein may be referred to as a Membrane-Enabled Reverse Lung (MERL).

Embodiments of the MERL described herein concentrate, by volume, $CO_2$ by a very large factor. For example, embodiments of the MERL described herein may concentrate $CO_2$ from a level of about 0-1% by volume in air up to a concentration of about 30-100% by volume. Additionally, the stream of concentrated $CO_2$ is fixed with the hydrogen that is produced by the electrochemical cell, rather than thermophysically. Embodiments of the MERL described herein concentrate $CO_2$ more efficiently than any known thermophysical process. For purposes of comparison, and by way of example, the thermodynamic calculations and experimental results of one known thermophysical process are described in Eisaman, M. D., et al.; "$CO_2$ Separation Using Bipolar Membrane Electrodialysis"; Energy & Environmental Science 4, 1319-1328 (2011).

Embodiments of the MERL described herein also electrolyze water into $H_2$ and $O_2$ using an intrinsically-safe mechanical design. In the field of human life support in hazardous environments, the term "intrinsically safe" is taken to mean "multi-fault tolerant", in particular "two-fault tolerant" (i.e., two simultaneous faults in the equipment will not endanger humans, or other life support equipment on which human life is dependent).

Figure 1:
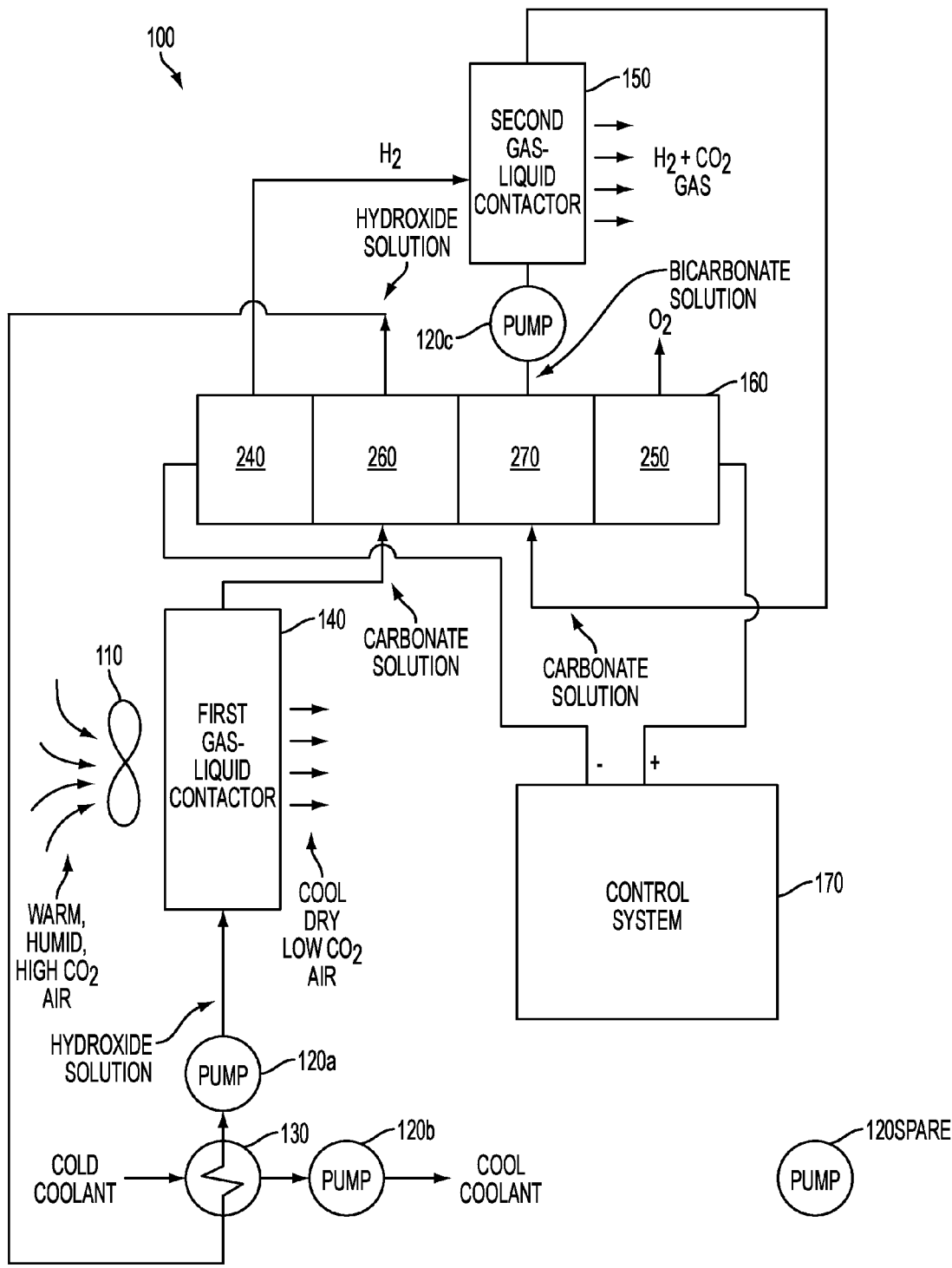
FIG. 1 is a block diagram of a Membrane-Enabled Reverse Lung (MERL) in accordance with a first embodiment of the invention.

FIG. 1 is a block diagram of a MERL 100 in accordance with a first embodiment of the invention. The MERL 100 includes an air fan 110, three liquid pumps 120a, 120b, 120c, a cooling heat exchanger 130, two gas-liquid contactors 140, 150, an electrochemical cell 160, and may include a control system 170.

In one embodiment, the electrochemical cell 160 is comprised of a stack of cells. The electrochemical cells 160 of the type described herein are available from Giner Inc. of Newton, Mass. Each cell has four fluid passages 240, 250, 260, 270, two passages for gases (240, 250) and two passages for liquids (260, 270). The passages are separated by gas-impermeable membranes, which will be described in detail in connection with FIG. 3.

Hydrogen ($H_2$) and oxygen ($O_2$) gasses are produced in separate gas passages 240, 250, and highly concentrated electrolyte solutions with low water vapor pressure are pumped through the separate liquid passages 260, 270. A hydroxide-carbonate solution is pumped through a first liquid passage 260 and a carbonate-bicarbonate solution is pumped through a second liquid passage 270.

Returning to FIG. 1, in a preferred embodiment, an air fan 110 pushes air through a first microgravity-compatible nanoporous hydrophobic hollow-fiber-membrane gas-liquid contactor 140, in which $CO_2$, water vapor, and heat absorb from the air into cold concentrated hydroxide solution with low water vapor pressure. The concentrated hydroxide solution, flows from the first liquid passage 260 output into a first liquid pump 120a via a cooling heat exchanger 130 (CHX). Pump 120a pumps the cold concentrated hydroxide solution into the first gas-liquid contactor 140. The $CO_2$ absorbed into the hydroxide solution converts the hydroxide solution into carbonate solution in the first gas-liquid contactor 140. The carbonate solution flows from the output of the first gas-liquid contactor 140 into the input of the first liquid passage 260. The electrochemical cell 160 then converts the carbonate solution back into hydroxide solution and the cycle repeats itself. The first liquid passage 260, the cooling heat exchanger 130, the pump 120a, and the first gas-liquid contactor 140 may form a first loop or first electrolyte circuit. The first loop may be a closed loop for the electrolyte solution flowing therein. In operation, the speed of the flow of liquid through the first loop may be varied or may be constant.

Absorbed heat from the air and heat generated from the electrochemical cell process are removed from the hydroxide solution in the cooling heat exchanger 130 just upstream of the first gas-liquid contactor 140, thereby chilling the hydroxide solution for water vapor and heat removal from air. A second liquid pump 120b moves coolant through the cooling heat exchanger 130 at a rate sufficient to remove the heat absorbed from the air and the heat generated from the electrochemical process occurring in the electrochemical cell 160. The speed of pump 120b may be varied to affect the rate of heat removal.

The electrochemical cell 160 also converts a carbonate solution into a bicarbonate solution with high $CO_2$ vapor pressure. The bicarbonate solution may be pumped by a third pump 120c through a second gas-liquid contactor 150, where $CO_2$ evolves into an $H_2$ flow produced from the first gas passage 240 of the electrochemical cell 160. In this way, the bicarbonate solution is converted back to carbonate solution, which is returned to the input of the second liquid passage 270, so that the cycle may begin again. The second liquid passage 270, the pump 120c, and the second gas-liquid contactor may form a second loop or second electrolyte circuit. The second loop may be a closed loop for the electrolyte solution flowing therein. In operation, the speed of the flow of liquid through the second loop may be varied or may be constant. The speeds of the flows of liquid through the first and second loops may be equal or not equal.

First and third liquid pumps 120a, 120b are located just upstream of the gas-liquid contactors 140, 150, so that highest pressures in the first and second electrolyte circuits are in the gas-liquid contactors 140, 150, insuring that the pressures of the liquids in the liquid passages of the gas-liquid contactors 140, 150 are always higher than the pressures of the gasses on the other sides of the hydrophobic nanoporous membranes of the liquid passages of the gas-liquid contactors 140, 150. Higher pressures in the liquid passages, in comparison to the pressures of gasses on the other sides of the liquid passages, ensure that no gas gets into the liquid flows.

In a preferred embodiment, the three liquid pumps 120a, 120b, 120c (collectively or individually referred to as 120) are identical. A fourth liquid pump $120_{Spare}$, identical to the other three liquid pumps 120 but not operationally coupled to the MERL 100, can serve as a spare for any of the three liquid pumps 120. A benefit, therefore, of the preferred embodiment of the MERL 100 is that only one spare pump $120_{Spare}$, identical to and suitable as a replacement for any of the three identical pumps 120, needs to be stored in the environment shared with the MERL 100.

Although one preferred embodiment of the MERL 100 operationally utilizes three identical liquid pumps 120, it is within the scope of the invention to utilize a pair of identical pumps and a third pump that is different from the other two, or three pumps where none are identical to another. Of course, if a pair of identical pumps and one different third pump were used, it would be desirable to carry a first spare pump as a replacement for either of the pair of identical pumps, and a second spare pump as a replacement for the third pump. Similarly, if three different pumps were used, it would be desirable to carry three spare pumps, one replacement for each of the different pumps.

In the embodiment of FIG. 1, the MERL 100 has only four moving parts, the air fan 110 and the three liquid pumps 120. Reliability, in view of failure of moving parts, is improved over competing systems that make use of more than four moving parts.

Figure 2:
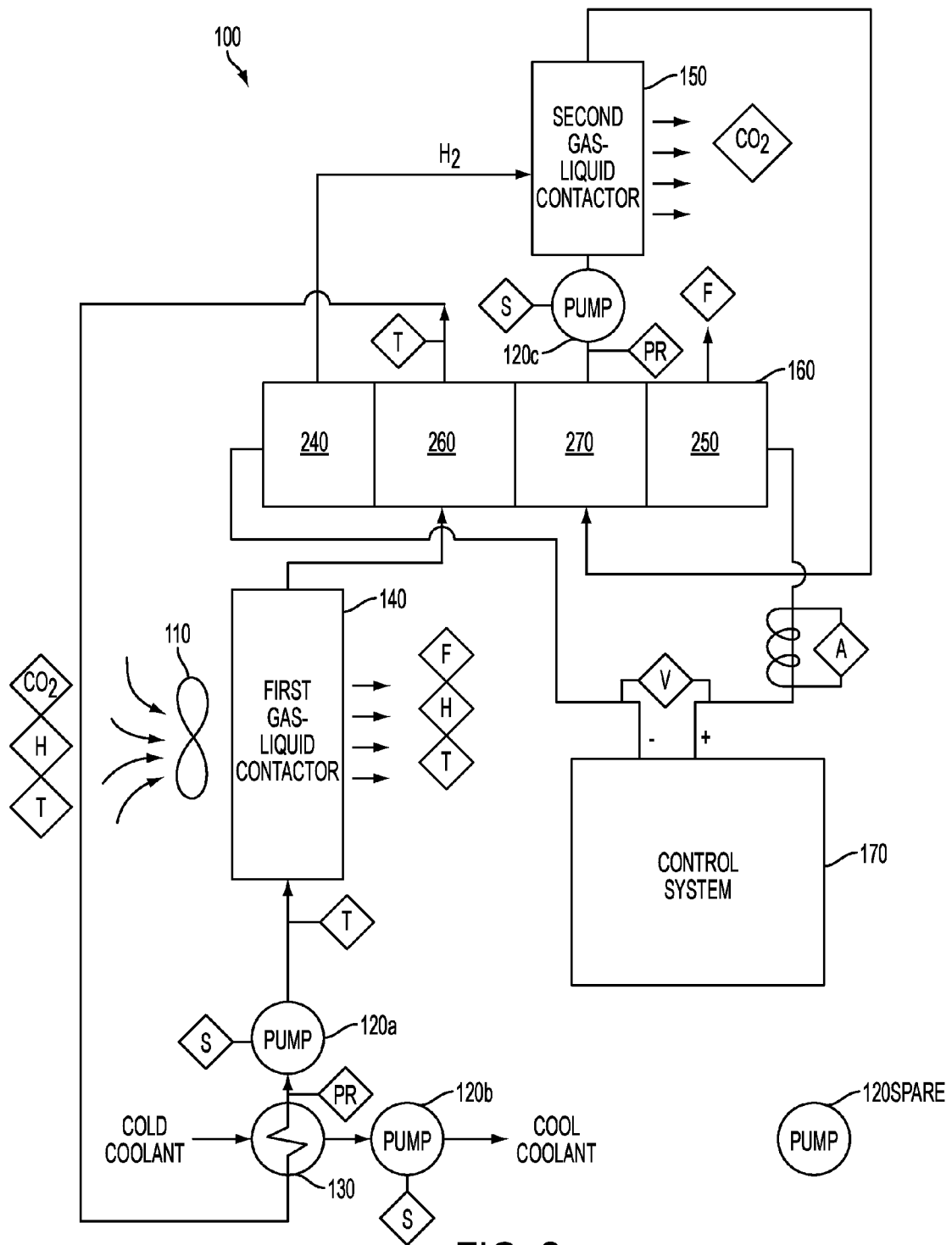
FIG. 2 is a block diagram of the MERL of FIG. 1, in which locations of multiple sensors have been identified in accordance with an embodiment of the invention.

FIG. 2 is a block diagram of the MERL of FIG. 1, in which locations of multiple sensors have been identified in accordance with an embodiment of the invention. The sensors are represented by diamond shapes with letters placed therein. Although the sensors are useful for automated operation of the MERL 100, the scope of the invention embraces embodiments with or without sensors.

In one embodiment, the three liquid pumps 120 may be variable-speed positive-displacement pumps, with pump speed sensors (S) to monitor liquid flow rates. Flow meters (F) may monitor air, $H_2$, and $O_2$ flow rates. $CO_2$ levels in incoming air and outgoing $H_2$—$CO_2$ gas mixture may be monitored using $CO_2$ sensors ($CO_2$) to determine MERL 100 $CO_2$ removal and concentration performance. Temperature (T) and humidity (H) sensors may monitor the temperature and humidity (water vapor level or content) of incoming and outgoing air to determine MERL 100 heat and water vapor removal performance. Electrochemical cell 160 internal temperature may be monitored with a temperature sensor (T) at the outlet of the first liquid passage 240 of the electrochemical cell 160. The temperature of the solution at the first gas-liquid contactor 140 inlet may also be monitored with a temperature sensor (T); this temperature may be controlled by the rate at which coolant is pumped through the coolant heat exchanger 130, and may be used to control the rate of water vapor removal from air to match the water consumption rate by electrolysis in the electrochemical cell 160. A pressure reference (PR) sensor may be placed in each liquid circuit just upstream of its pump 120, at the lowest pressure in the circuit; this PR sensor monitors liquid volume in the circuit, rising in pressure with positive water balance and falling with negative balance. The voltage and current of the electrochemical cell may be monitored with a voltage sensor (V) and current sensor (A). Electrical power to the electrochemical cell 160 controls the rate of water electrolysis and $H_2/O_2$ production.

The MERL 100 may include a controller 170. The various sensors, $CO_2$, A, T, PR, F, V, H as described above may each provide data (analog or digital) to the controller 170. In order to avoid increasing the complexity of FIG. 2, the illustration of the interconnections between the various sensors and the controller 170 was omitted.

The controller 170 may include analog and/or digital circuit components (not shown) that were configured/programmed to receive signals from various ones of the just describe sensors and convert/process the received signals into output signals used to power and/or control, for example, the electrochemical cell 160, the pumps 120, and/or the fan 110, and/or to trigger one or more alarms.

A greater or lesser number of sensors than those described above may be used without departing from the scope of the invention. In the event that any sensed value, or ratio of sensed values, is outside of predetermined limits, the controller 170 may, for example, cause an alarm to issue (such as illuminate a warning light and/or generate a warning sound) or transmit a message that would otherwise alert the crew to an abnormality in the MERL 100. The controller 170 might be programed or hard-wired to remove electrical power from all components of the MERL 100 in the event of the detection of an out of limit sensed value or ratio of values. A more detailed description of the operation of the electrochemical cell 160 and gas-liquid contactors 140, 150 now follows.

Figure 3:
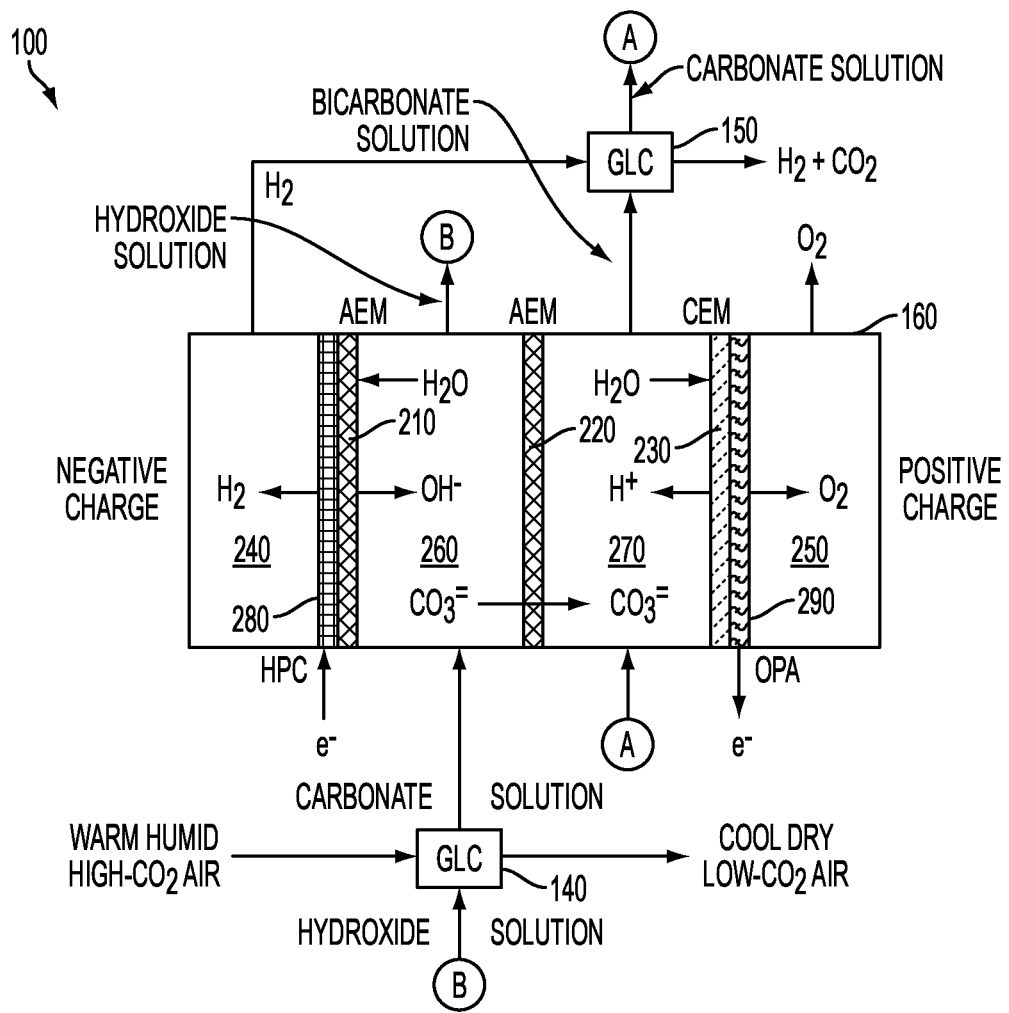
FIG. 3 is a functional block diagram of the MERL of FIGS. 1 and 2 in accordance with an embodiment of the invention

FIG. 3 is a functional block diagram of the MERL 100 of FIGS. 1 and 2 in accordance with an embodiment of the invention. In the functional block diagram of FIG. 3, the fan 110, pumps 120, heat exchanger 130, control system 170, and sensors have been removed for simplicity.

Although reference is made to a single four-passage electrochemical cell 160 herein, it will be understood that the same description applies to a stack of electrochemical cells arranged in series.

In the electrochemical cell 160, three gas impermeable membranes (referred to herein as first membrane 210, second membrane 220, and third membrane 230) separate a first gas passage 240, in which $H_2$ gas is produced, from a second gas passage 250, in which $O_2$ gas is produced. Based on the mechanical design of this embodiment, mixing of $O_2$ and $H_2$ gases generated during MERL 100 operation requires the simultaneous existence of structural failures in each of the three gas impermeable membranes 210, 220, 230. Consequently, the MERL is two-fault tolerant for mixing of $H_2$ and $O_2$ gases, making the MERL 100 intrinsically safe in accordance with the meaning of intrinsically safe as defined in paragraph 00020 above. Significantly, the intrinsic safety of the MERL 100 is provided by its three membrane 210, 220, 230 mechanical design, not by a heavy explosion-proof enclosure (such as that used in the ISS).

In the preferred embodiment of FIG. 3, the electrochemical cell 160 is a four-passage electrochemical cell, with first and second gas passages 240, 250 and first and second liquid passages 260, 270. As indicated above, $H_2$ and $O_2$ are produced in the first and second gas passages 240, 250, respectively. Highly concentrated electrolyte solutions with low water vapor pressure are circulated through the first and second liquid passages 260, 270. In the embodiments described herein, the electrolyte solutions may be aqueous solutions of carbonates with high water solubility, including, but not limited to, cesium carbonate at concentrations of at least about three gram-moles per liter.

In the preferred embodiment, a hydroxide-carbonate solution flows through the first liquid passage 260 of the electrochemical cell 160, and a carbonate-bicarbonate solution flows through the second liquid passage 270 of the electrochemical cell 160. The first and second liquid passages 260, 270 are separated from one another by the second gas impermeable membrane 220. The second gas impermeable membrane 220 may be an anion-exchange membrane (AEM).

The first gas passage 240 (also referred to herein as the $H_2$ passage) and the first liquid passage 260 are separated by the first gas impermeable membrane 210. The first gas impermeable membrane 210 may also be an anion-exchange membrane. The first and second gas impermeable membranes may both be anion-exchange membranes; however, they need not be made of the same material.

A hydrogen production cathode 280 (HPC) may be positioned on the gas side of the first gas impermeable membrane 210. The combined first gas impermeable anion-exchange membrane 210 and hydrogen production cathode 280 may be referred to herein as a hydrogen membrane electrode assembly (HMEA).

Similarly, the second gas passage 250 (also referred to herein as the $O_2$ passage) and the second liquid passage 270 are separated by the third gas impermeable membrane 230. The third gas impermeable membrane 230 may be a cation-exchange membrane (CEM).

An oxygen production anode 290 (OPA) may be positioned on the gas side of the third gas impermeable membrane 230. The combined third gas impermeable cation-exchange membrane 230 and oxygen production anode 290 may be referred to herein as an oxygen membrane electrode assembly (OMEA).

Voltage applied between the electrodes (i.e., between the hydrogen production cathode 280 and the oxygen production anode 290) causes water splitting and gas production at the electrodes and ion flow through the anion and cation-exchange membranes 210, 220, 230 and liquid solutions in the electrochemical cell 160, with electrical current flow into and out of the electrodes 280, 290.

In one embodiment, it is envisioned that in operation, warm, humid, high-$CO_2$ air will be blown by the fan 110 into the first gas-liquid contactor 140. Cold concentrated hydroxide solution, with low water vapor pressure, will be pumped into the first gas-liquid contactor 140. $CO_2$, water vapor, and heat will be absorbed into the cold concentrated hydroxide solution from the air being blown by the fan 110 into the first gas-liquid contactor 140. In operation, it may be expected that the temperature of the air flowing into the first gas-liquid contactor 140 may range from about 70° F. to 80° F. The absolute humidity (water vapor pressure) of the air may be expected to range from about 10 torr to 20 torr. The $CO_2$ partial pressure of the air may be expected to be less than about 3.8 torr. The temperature of the cold concentrated hydroxide solution flowing through the first liquid passage 260 may range from about 45° F. to about 55° F. The water vapor pressure of the cold concentrated hydroxide solution flowing through the first liquid passage 260 may be lower than about 10 torr. The values provided herein are the best estimates of the inventor for one embodiment of the MERL 100. The values just mentioned are exemplary and not limiting.

In a preferred embodiment, for environments having normal gravity and for environments having microgravity (such as the ISS), the first gas-liquid contactor 140 and soon to be described second gas-liquid contactor are each microgravity-compatible nanoporous hydrophobic hollow-fiber-membrane gas-liquid contactors. This type of gas-liquid contactor is preferred as it has the highest membrane area per unit volume known to the inventor. The gas-liquid contactors 140, 150 utilized in the preferred embodiment offer the benefits of reduced size and improved efficiency in comparison to other known types of gas-liquid contactors.

Referring to FIG. 3, in the first gas-liquid contactor 140, the absorbed $CO_2$ converts hydroxide into carbonate. Carbonate ions ($CO_3^=$) migrate through the central second gas impermeable anion-exchange membrane 220 and are replaced by hydroxide ions ($OH^-$) evolving from the first gas impermeable anion-exchange membrane 220 into the first liquid passage 260, converting carbonate solution in the first liquid passage 260 back to hydroxide solution. Absorbed heat and heat produced by operation of the MERL 100 are removed from the hydroxide solution in the first liquid passage 260 by use of the cooling heat exchanger 130, which is just upstream of the first gas-liquid contactor 140, thereby chilling the hydroxide solution entering the first liquid passage 260; the hydroxide solution entering the first gas-liquid contactor 140 is cold and has very low water vapor pressure, thereby removing heat and water vapor from the air flowing through the first gas-liquid contactor 140.

Still referring to FIG. 3, carbonate solution flowing through the second liquid passage 270 is converted to bicarbonate solution, with high $CO_2$ vapor pressure, by hydrogen ions ($H^+$) evolving from the third gas impermeable cation-exchange membrane 230. In the embodiment described herein, the $CO_2$ vapor pressure of the bicarbonate solution is estimated to be about 230 torr. Bicarbonate solution flowing through the second liquid passage 270 enters the second gas-liquid contactor 150, where $CO_2$ evolves into $H_2$ gas, which flows out from the second gas-liquid contactor 150, whereby the bicarbonate solution flowing into the second gas-liquid contactor 150 is converted back to carbonate solution.

Within the hydrogen membrane electrode assembly (comprised of the first gas impermeable anion-exchange membrane 210 and the hydrogen production cathode 280), water splits into $H^+$ and $OH^-$ ions, and H+ ions and electrons from the hydrogen production cathode 280 produce $H_2$ gas, with $OH^-$ ions migrating through the anion-exchange membrane 210 into the first liquid passage 260

Within the oxygen membrane electrode assembly (comprised of the third gas impermeable cation-exchange membrane 230 and the oxygen production anode 290), water splits into $H^+$ and $OH^-$ ions, and $OH^-$ ions are converted into $O_2$ gas, water, and electrons on the oxygen production anode 290, with $H^+$ ions migrating through the cation-exchange membrane 230 into the second liquid passage 270.

The embodiments of the MERL 100 described herein integrate physiochemical and electrochemical reactions and gas-liquid mass transfer steps described above in one machine, utilizing a single electrochemical cell (or series stack of such cells) and two gas-liquid contactors in a unique microgravity-compatible manner to absorb $CO_2$, heat, and water vapor from air, concentrate, by volume, the level of $CO_2$ in air by a factor or 100 or more, and produce separate streams of atmospheric pressure $O_2$ and mixed $H_2$ and concentrated $CO_2$, using a single air fan 110 and three liquid pumps 120 as moving parts. The low number of moving parts implies that spares for a single MERL 100 are comprised of one spare fan and one spare liquid pump. As stated above, embodiments of the MERL 100 described herein are intrinsically safe, because $H_2$ and $O_2$ gases are separated by three gas impermeable membranes. The $H_2$ and $O_2$ gases can only mix if gas-leakage/structural failure of all three membranes 210, 220, 230 in the electrochemical cell 160 exist simultaneously, an extremely unlikely event. Accordingly, the embodiments of the MERL 100 described herein are two-fault tolerant for production of an explosive $H_2$—$O_2$ mixture, and thus do not need heavy explosion-proof housings.

Figure 4:
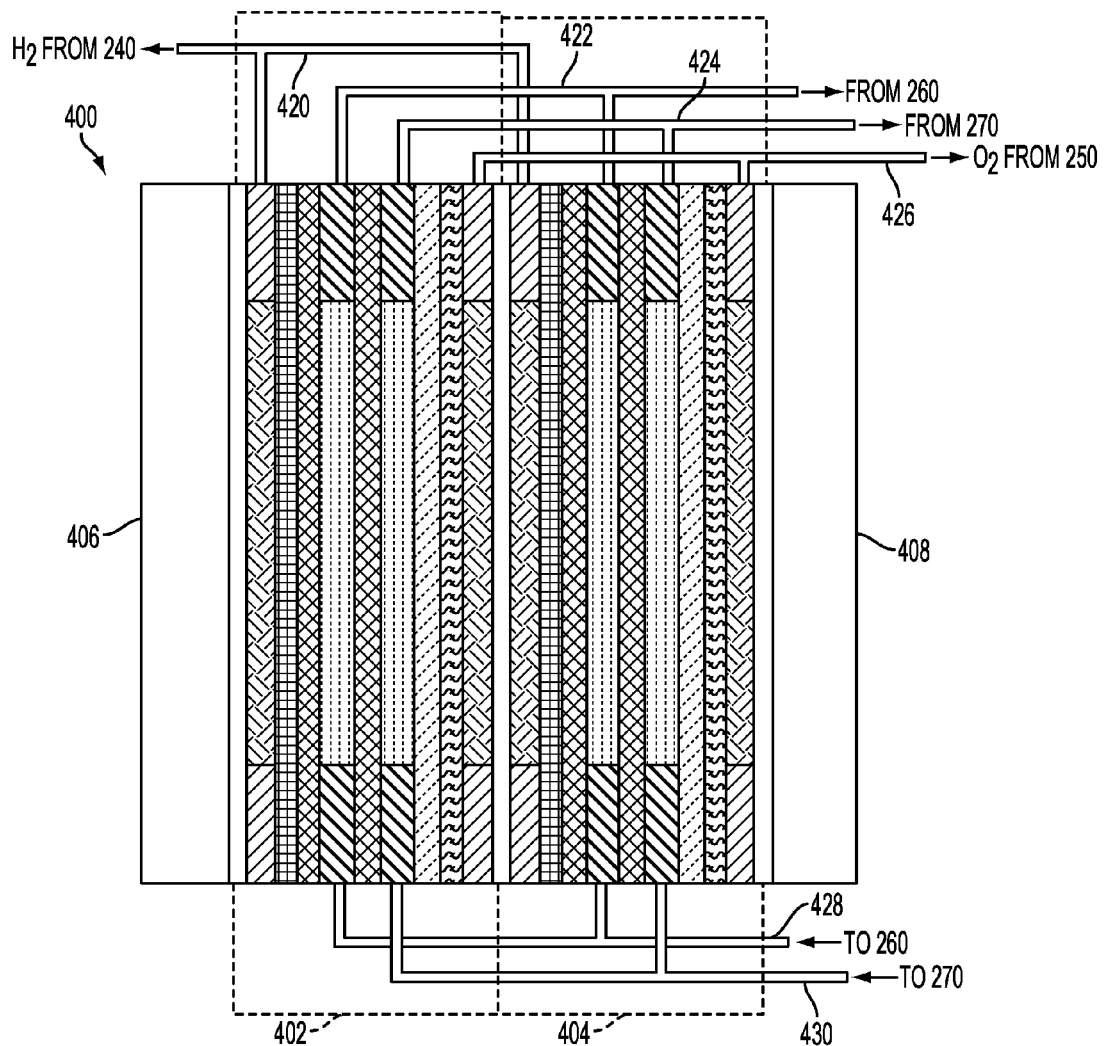
FIG. 4 is a schematic representation of a series connected "stack" of multiple four-passage electrochemical cells in accordance with an embodiment of the invention.

FIG. 4 is a schematic representation of a series connected "stack" of multiple four-passage electrochemical cells in accordance with an embodiment of the invention. The illustration of FIG. 4 is not drawn to scale. In the embodiment of FIG. 4, two four-passage electrochemical cells 400, 402 (each similar to FIG. 2, ref. no. 160) are connected in series and sandwiched between two end plates 404, 406.

Stacks of more than two four-passage electrochemical cells are envisioned and are within the scope of the invention. For example, it is envisioned that a stack of fourteen four-passage electrochemical cells could be used in the ISS.

With reference to the exemplary embodiment of FIG. 4, in each four-passage cell 402, 404, a central anion-exchange membrane 210 (similar to 220) separates two liquid electrolyte flow passages (similar to 260, 270). The liquid electrolyte flow passages are surrounded by a nonconductive liquid flow cell frame 418 (LFCF). A hydrogen membrane-electrode assembly (HMEA) comprised of a hydrogen production cathode 280 and an anion-exchange membrane 210, separates an $H_2$ gas flow passage (similar to 240) from the left-hand liquid passage (similar to 260), and an oxygen membrane-electrode assembly (OMEA) comprised of an oxygen production cathode 290 and a cation-exchange membrane 230, separates an $O_2$ gas flow passage (similar to 250) from the right-hand liquid passage (similar to 270). The gas flow passages are surrounded by nonconductive gas flow cell frames (GFCFs) 416. A nonporous conductive cell separator (NCCS) 410 conducts electrical current and separates electrochemical cells 402, 404 from each other and from the nonconductive end plates 406, 408, which provide mechanical compression and fluid inlet and outlet ports for the stack of cells.

In the embodiment of FIG. 4, a porous nonconductive flow spacer (PNFS) 414 fills each liquid passage, promoting turbulent flow for high ion mass transfer rates through the liquid. Other structures, materials, or spacers may be used to promote turbulent flow. A porous conductive flow spacer (PCFS) 412 fills each gas passage, conducting electric current between each electrode and its adjacent NCCS 410. Other structures, materials, or spacers may be used to conduct electric current between each electrode and its adjacent NCCS 410. Cell frames 416, 418 provide fluid distribution by fluidly connecting like fluid flow passages to collection and distribution conduits 420, 422, 424, 426, 428, 430, which provide passages for gas and liquid flows to and from the fluid flow passages.

The collection and distribution conduits can be internal or external to the overall structure of the MERL. For example, in one embodiment, all cell stack components except flow spacers have six holes that align to provide six fluid flow manifolds from one end plate 406, 408 into the other 408, 406. In this embodiment, holes for liquid flow are surrounded by seals, to prevent electrical short-circuiting through the conductive electrolyte. Other structures may also be used to prevent electrical short-circuiting through the conductive electrolyte. Additionally, other designs of collection and distribution conduits to connect like fluid flow passages of multiple electrochemical cells in a multiple electrochemical cell stack are within the scope of the invention.

Using an electrochemical process performed in a single machine using a single four-channel electrochemical cell (or a series stack of such cells), the embodiments of the MERL described herein perform six functions, namely, removal of heat, water vapor, and $CO_2$ from air, production hydrogen and oxygen, concentration of $CO_2$ by a large factor, and production of a mixture of $H_2$ and concentrated $CO_2$ gasses. The factor of concentration can be 100 times or greater than the concentration by volume of $CO_2$ in air at one atmosphere pressure. These functions are performed in closed environments, such as in crewed spacecraft or submarines, with seven components and four moving parts. This is the highest level of functional integration ever achieved in life support technology; MERL is much smaller, lighter, and simpler than any set of separate machines, each performing one or two of the six MERL life support functions.

MERL Projected Performance

It is anticipated that the open-circuit voltage (OCV) of a MERL 100 electrochemical cell 160 in accordance with the embodiments described herein will be about 2.0 V, which is derived from the sum of a hydrogen production cathode (FIG. 2, ref. 280) OCV of about 0.8 V (typical of a basic hydrogen electrode) and an oxygen production cathode (FIG. 2, ref. no. 290) OCV of about 1.2 V (typical of an acidic oxygen electrode). Daily average continuous electrical current to process 2.2 lbm of $CO_2$ and generate 1.8 lbm of $O_2$ for one person is estimated to be about 115 A. If the active area of each electrode in a manufactured electrochemical cell (similar to electrochemical cell 160) is given to be about 0.04 $m^2$, then 14 electrochemical cells in electrical series results in a total electrode area of about 0.56 $m^2$. One such stack of 14 electrochemical cells might be available per person. The resulting electrical current density of about 20.5 $mA/cm^2$ (115 A/0.56 $m^2$) is so low that 70% overall electrochemical efficiency is achievable. Accordingly, and based on a stack of 14 electrochemical cells, the power consumption for one person per day is calculated to be about 330 W. For a six person crew on the ISS, power consumption is calculated to be about 2000 W. With air fan 110 power of about 100 W, liquid pump 120 power of about 50 W each, and operational power consumption of about 150 W, total power consumption of a device to purify the air made in accordance with the embodiments of the invention described herein for a six person crew is about 2400 W.

Sized for six people on the ISS, a stack of 14 electrochemical cells in accordance with the embodiments of the invention described herein requires about 3.4 $m^2$ of area for each electrode. Divided into eighty-four (i.e., six persons multiplied by 14 cells each) 0.04 $m^2$ electrochemical cells as described herein, the estimated volume of stacks of cells needed for a six person crew is about three $ft^3$, and has an estimated mass of about 300 lbm (pound-mass). The gas-liquid contactors in accordance with the embodiments of the invention described herein could be comprised of about seven 210 $ft^2$ commercial-off-the-shelf (COTS) nanoporous hydrophobic hollow-fiber-membrane modules (six for air-liquid contact, and one for hydrogen-liquid contact) at 0.4 $ft^3$ volume and 10 lbm each. The cooling heat exchanger (similar to FIG. 2, ref. no 130) penalty is estimated to be about 0.2 $ft^3$ and 30 lbm. All other components are small relative to the stack of electrochemical cells, gas-liquid contactors, and the cooling heat exchanger. With 1.50 packaging factor for mass and 2.00 packaging factor for volume, it is projected that a six-person MERL for the ISS will weigh about 600 lbm and occupy about 12 $ft^3$ of volume (36"×20"×12").

Embodiments of the control system 170 described herein can be implemented using various means. In the implementation by hardware, a method of control according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like. Methods according to each embodiment of the present invention can be controlled by modules, procedures, and/or functions for performing the above-explained functions or operations. Software code for performing the methods described herein can be stored in a memory unit and is then drivable by a device, such as the processor described above. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

What is claimed is:

1. A method using an electrochemical process to remove gaseous carbon dioxide ($CO_2$), water vapor, and heat from air and to generate a stream of oxygen ($O_2$) gas and a stream of concentrated $CO_2$ gas, comprising:
    circulating a hydroxide solution through a first gas-liquid contactor;
    contacting, in the first gas-liquid contactor, the hydroxide solution with air flowing through the first gas-liquid contactor to remove $CO_2$, heat, and water vapor from the air and to convert the hydroxide solution into a first carbonate solution;
    circulating the first carbonate solution through an electrochemical cell to convert the first carbonate solution into the hydroxide solution;
    recirculating the hydroxide solution from the electrochemical cell back through the first gas-liquid contactor;
    generating hydrogen ($H^2$) gas in the electrochemical cell from the first carbonate solution;
    circulating a bicarbonate solution through a second gas-liquid contactor, separate from the first gas-liquid contactor;
    contacting, in the second gas-liquid contactor, the bicarbonate solution with the $H^2$ gas generated in the electrochemical cell to generate the stream of concentrated $CO_2$ and to convert the bicarbonate solution into a second carbonate solution, separate from the first carbonate solution;
    circulating the second carbonate solution through the electrochemical cell to convert the second carbonate solution into the bicarbonate solution;
    recirculating the bicarbonate solution from the electrochemical cell back through the second gas-liquid contactor; and
    generating the stream of $O_2$ gas in the electrochemical cell from the second carbonate solution.

2. The method of claim 1, further comprising applying a voltage to the electrochemical cell to generate the $H_2$ and $O_2$ gasses.

3. The method of claim 1, wherein the electrochemical cell is comprised of four adjacent channels, wherein voltage is applied between a hydrogen production cathode in a first channel and an $O_2$ production anode in a fourth channel to produce the $H_2$ and $O_2$ gas flows, wherein the first channel is separated from a second channel by a first anion-exchange membrane and first carbonate solution flows through the second channel, the second channel is separated from a third channel by a second anion-exchange membrane and second carbonate solution flows through the third channel, and the third channel is separated from the fourth channel by a cation-exchange membrane.

4. The method of claim 3, wherein the application of the voltage further causes ion flow through the first anion-exchange membrane separating the first channel from the second channel, the first electrolyte solution in the second channel, the second anion-exchange membrane separating the second from the third channel, the second electrolyte solution in the third channel, and the cation-exchange membrane separating the third from the fourth channel.

5. The method of claim 1, further comprising:
cooling the hydroxide solution subsequent to its conversion from the first bicarbonate solution in the electrochemical cell and prior to its recirculation through the first gas-liquid contactor.

6. The method of claim 1, further comprising:
varying a speed of a pump, circulating coolant through a cooling heat exchanger through which the hydroxide solution flows, to reduce a temperature of the hydroxide solution entering the cooling heat exchanger by an amount substantially equal to or greater than a rise in temperature realized by the hydroxide solution after absorbing heat from the air passing through the first gas-liquid contactor and from the electrochemical process occurring in the electrochemical cell.

7. A method using an electrochemical process to remove gaseous carbon dioxide ($CO_2$), water vapor, and heat from air and to generate a stream of oxygen ($O_2$) gas and a stream of concentrated $CO_2$ gas, comprising:
blowing air through a first gas-liquid contactor configured to convert a first precursor solution into a first electrolyte solution,
flowing the first electrolyte solution into a second channel of a four channel electrochemical cell,
flowing a second electrolyte solution into a third channel of the four channel electrochemical cell;
applying a voltage between a hydrogen producing cathode in a first channel of the four channel electrochemical cell and an oxygen producing anode in a fourth channel of the four channel electrochemical cell to cause water splitting, $H^2$ gas production at the cathode for $H^2$ gas flow from the first channel, oxygen gas production at the anode for oxygen gas flow from the fourth channel, and ion flow through a first anion-exchange membrane separating the first from the second channels, the first electrolyte solution, a second anion-exchange membrane separating the second from the third channels, the second electrolyte solution, and a cation-exchange membrane separating the third and fourth channels
flowing a second precursor solution produced in the third channel through a second gas-liquid contactor configured to absorb the $H^2$ gas flow from the first channel into the second precursor solution to emit $H_2$ and $CO_2$ gas and to convert the second precursor solution into the second electrolyte.

8. The method of claim 7, wherein the first and second electrolyte solutions are carbonate solutions, the first precursor solution is a hydroxide solution and the second precursor solution is a bicarbonate solution.

9. The method of claim 7, wherein, during ion flown,
carbonate ions migrating through the second anion-exchange membrane from the second to the third channel are replaced in the second channel by hydroxide ions ($OH^-$) evolving from the first anion-exchange membrane, thus converting the first carbonate solution back to the first precursor hydroxide solution for recirculation into the first gas-liquid contactor; and
wherein carbonate ions migrating through the second anion-exchange membrane from the second to the third channel combine with hydrogen ions ($H^+$) evolving from the cation-exchange membrane, thus converting the second carbonate solution back to the precursor bicarbonate solution for recirculation into the second gas-liquid contactor.

10. The method of claim 7, wherein water splitting comprises:
splitting water into $OH^-$ and $H^+$ ions within the first anion-exchange membrane, where the $H^+$ ions and electrons from the hydrogen production cathode produce $H_2$ gas in the first passage and the $OH^-$ ions migrate through the first anion-exchange membrane into the second passage;
splitting water into $OH^-$ and $H^+$ ions within the cation-exchange membrane, where the $OH^-$ ions and protons from the oxygen production cathode produce $O^2$ gas in the fourth passage and the $H^+$ ions migrate through the cation exchange membrane into the third passage, and
wherein the second anion-exchange membrane permits carbonate ions ($CO_3^=$) to migrate from the second to the third passages and is impermeable to a counter-flow of cations.

11. The method of claim 7, further comprising:
cooling the first precursor solution prior to its circulation into the first gas-liquid contactor.

12. An apparatus, to remove gaseous carbon dioxide ($CO_2$), water vapor, and heat from air and to generate a stream of oxygen ($O_2$) gas and a stream of concentrated $CO_2$ gas, comprising:
a first gas-liquid contactor configured to:
absorb $CO_2$, water vapor, and heat from air into a hydroxide solution circulating through the first gas-liquid contactor, and
convert the hydroxide solution into a first carbonate solution by reaction with the absorbed $CO_2$;
an electrochemical cell configured to:
receive the first carbonate solution from the first gas-liquid contactor,
convert the first carbonate solution back into the hydroxide solution,
electrolyze the water vapor from the air into separate hydrogen ($H_2$) and oxygen ($O_2$) gas flows, and
convert a second carbonate solution, different from the first carbonate solution, into a bicarbonate solution;
a first pump configured to receive the hydroxide solution from the electrochemical cell and recirculate the hydroxide solution back through the first gas-liquid contactor;
a second pump configured to receive the bicarbonate solution from the electrochemical cell;
a second gas-liquid contactor configured to:
receive the bicarbonate solution pumped from the second pump,
desorb $CO_2$ from the bicarbonate solution into the $H_2$ gas flow from the electrochemical cell to produce concentrated $CO_2$ gas, and
convert the bicarbonate solution back into the second carbonate solution.

13. The apparatus of claim 12, further comprising:
a heat exchanger, interposed between an output of the electrochemical cell and an input of the first gas-liquid contactor, configured to receive the hydroxide solution and transfer heat from the hydroxide solution into a flow of a cooling liquid circulating through the heat exchanger; and a third pump to circulate the cooling liquid through the heat exchanger.

14. The apparatus of claim 13, wherein the third pump is a variable speed pump whose speed is varied to reduce a temperature of the hydroxide solution entering the cooling heat exchanger by an amount substantially equal to or greater than a rise in temperature realized by the hydroxide solution after absorbing heat from the air passing through the first gas-liquid contactor and from the electrochemical process occurring in the electrochemical cell.

15. The apparatus of claim 12, wherein the first and second carbonate solutions are concentrated aqueous solutions, with low water vapor partial pressure, of carbonate compounds with high water solubility.

16. The apparatus of claim 12, wherein the first and second gas-liquid contactors comprise nanoporous hydrophobic hollow-fiber membranes configured to transfer gas and heat between gas flows and aqueous solution flows.

17. The apparatus of claim 12, wherein the first and second gas-liquid contactors comprise nanoporous hydrophobic hollow-fiber membranes configured to transfer gas and heat between gas flows and aqueous solution flows in a microgravity environment.

18. The apparatus of claim 12, wherein the electrochemical cell is comprised of first, second, third and fourth fluid flow passages, wherein the first and second fluid flow passages are adjacent to one another and separated by a solid first anion-exchange membrane, the second and third fluid flow passages are adjacent to one another and separated by a solid second anion-exchange membrane, and the third and fourth fluid flow passages are adjacent to one another and separated by a solid cation-exchange membrane.

19. The apparatus of claim 18, wherein the electrochemical cell is further comprised of an $H_2$ production cathode adjacent to the first anion-exchange membrane in the first fluid flow passage and an $O_2$ production anode adjacent to the first cation-exchange membrane in the fourth fluid flow passage.

20. The apparatus of claim 12, further comprising a fan configured to blow air into the first gas-liquid contactor.

* * * * *